United States Patent
Yoon

(10) Patent No.: US 8,817,829 B2
(45) Date of Patent: Aug. 26, 2014

(54) APPARATUS FOR GENERATING SINGLE-POLARIZATION MODE-LOCKED LASER CAPABLE OF ENERGY CONTROL

(75) Inventor: Tai-Hyun Yoon, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 14/123,550

(22) PCT Filed: May 31, 2012

(86) PCT No.: PCT/KR2012/004307
§ 371 (c)(1),
(2), (4) Date: Dec. 3, 2013

(87) PCT Pub. No.: WO2012/165878
PCT Pub. Date: Dec. 6, 2012

(65) Prior Publication Data
US 2014/0105233 A1    Apr. 17, 2014

(30) Foreign Application Priority Data
Jun. 3, 2011    (KR) .......................... 10-2011-0053852

(51) Int. Cl.
*H01S 3/30*    (2006.01)
(52) U.S. Cl.
USPC ..................................... 372/6; 372/18; 372/25
(58) Field of Classification Search
USPC ................................................ 372/6, 18, 25
See application file for complete search history.

(56) References Cited

U.S. PATENT DOCUMENTS

| 5,627,848 A * | 5/1997 | Fermann et al. | 372/18 |
| 5,701,319 A * | 12/1997 | Fermann | 372/18 |
| 2005/0163426 A1* | 7/2005 | Fermann et al. | 385/37 |
| 2011/0069723 A1* | 3/2011 | Dong et al. | 372/6 |

FOREIGN PATENT DOCUMENTS

| JP | 09167869 A | 6/1997 |
| JP | 2002118315 A | 4/2002 |
| KR | 1020070062194 A | 6/2007 |
| KR | 101027321 B1 | 3/2011 |

* cited by examiner

*Primary Examiner* — Kinam Park
(74) *Attorney, Agent, or Firm* — William Park & Associates Patent Ltd.

(57) ABSTRACT

Provided is an apparatus for generating a single-polarization mode-locked laser capable of energy control. The apparatus for generating a single-polarization mode-locked laser is configured to adjust at least one of a focal length of a lens focusing laser light on a semiconductor saturable absorber mirror (SESAM) functioning as a saturable absorber, power of pump laser light, and reflectivity of an output coupler (OC) to set fluence, which is defined as energy density per unit area of the laser light incident on the saturable absorber, to be greater than reference fluence, which is energy density per unit area of the laser light incident on the saturable absorber when reflectivity of the saturable absorber is a maximum. Accordingly, it is possible to generate a single-polarization mode-locked laser, of which energy can be controlled, without generating multiple pulses.

20 Claims, 5 Drawing Sheets

APPARATUS FOR GENERATING SINGLE-POLARIZATION MODE-LOCKED LASER CAPABLE OF ENERGY CONTROL

TECHNICAL FIELD

The present invention relates to an apparatus for generating a laser, and more particularly, to an apparatus for generating a single-polarization mode-locked laser capable of energy control.

BACKGROUND ART

A mode-locked fiber laser oscillator that has a pulse energy of 10 to 100 nJ at a repetition rate of about 1 to 500 MHz without using a power amplifier can be used for various applications such as a two-photon microscope, a high-penetration optical coherence tomography, and an optical frequency comb (OFC) generator. In a mode-locked fiber laser operating in an abnormal dispersion region such as an erbium (Er)-doped fiber laser, a soliton energy $E\tau$ (where E denotes soliton energy, and $\tau$ denotes a pulse width) is kept at a constant value due to balance between a Kerr non-linearity $\gamma$ and a group velocity dispersion (GVD) D of an internal resonant device. In general, a pulse energy of each laser resonator is limited to several tens of pJ due to a limitation on a soliton area imposed by constancy of the GVD D and the non-linearity $\gamma$ of the laser resonator. An Er/ytterbium (Yb)-doped fiber laser operating at 1.5 µm is an example. To generate a soliton pulse having an energy of 10 nJ or more, a laser oscillator having an amplifier or a multifilament core fiber of a large mode area is required.

Meanwhile, it has been experimentally and theoretically proved that energy of a dissipative soliton fiber laser (DSFL) having a linearly chirped output pulse can be controlled in a normal dispersion region. Similaritons and all-normal dispersion Yb-doped mode-locked fiber oscillators (YMFOs) oscillating at 1.03 µm are good examples. Furthermore, a modified soliton area theorem that provides a method for generating high pulse energy with different resonator structures having all-normal dispersion has been developed. However, it is difficult to obtain a pulse energy of 40 nJ or more using a conventional YMFO due to transition to a multipulse region.

Thus far, only a few YMFOs have been reported as having a pulse energy of 20 nJ or more. For example, an all-normal dispersion YMFO with two pump diodes, a cladding pumped double cladding YMFO, and an Yb-doped large mode area photonic crystal fiber oscillator show a pump-to-output-power conversion (POCE) of 50% or less. In particular, a ring resonator that employs a non-linear polarization rotation technique for passive mode locking should utilize discrete spectral filters to generate a mode-locked pulse. These systems utilize multiple resonant devices under a complex structure. Thus, these systems generally have a large size, and are difficult to fabricate to stably operate for a long time. OFC applications need to stably operate for a long time while having low phase noise so as to synthesize a highly stable radio frequency (RF) signal for an experiment of 9.2-GHz atomic clock transition in a cesium (Cs) atomic fountain clock.

DISCLOSURE

Technical Problem

The present invention is directed to an apparatus for generating a single-polarization mode-locked laser that emits a laser with high pulse energy while operating in a single pulse region, and is capable of energy control.

Technical Solution

One aspect of the present invention provides an apparatus for generating a single-polarization mode-locked laser, including: a pump laser generator configured to generate a pump laser having a predetermined wavelength; a gain controller formed of an optical fiber whose core is doped with a gain material; a lens unit including a first lens configured to generate parallel light by shifting a path of laser light output from one end of the optical fiber constituting the gain controller, and a second lens configured to focus the parallel light passed through the first lens on a certain area by shifting a path of the parallel light; a polarization controller formed of a quarter-wave plate (QWP) disposed between the first lens and the second lens, and configured to control polarization of the laser light by adjusting an angle thereof with respect to a high-speed axis or low-speed axis of the optical fiber constituting the gain controller; a saturable absorber configured to saturably absorb and reflect the laser light passed through the second lens; a resonance controller formed of a single-mode fiber (SMF), and configured to adjust a resonance length; an output coupler (OC) in which a Bragg grating is formed from one end toward the other end, and configured to output mode-locked laser light; and a pump light coupler connected between the gain controller and the resonance controller or between the resonance controller and the OC, and configured to receive the pump laser from the pump laser generator and provide the pump laser toward the saturable absorber, or provide the mode-locked laser light to the OC. Here, at least one of a focal length of the second lens, power of the pump laser output from the pump laser generator, and reflectivity of the OC is adjusted to set fluence, which is defined as energy density per unit area of the laser light incident on the saturable absorber, to be greater than reference fluence, which is energy density per unit area of the laser light incident on the saturable absorber when reflectivity of the saturable absorber is a maximum.

Another aspect of the present invention provides an apparatus for generating a single-polarization mode-locked laser, including: a pump laser generator configured to generate a pump laser having a predetermined wavelength; a gain controller formed of an optical fiber whose core is doped with a gain material; a lens unit including a first lens configured to generate parallel light by shifting a path of laser light output from one end of the optical fiber constituting the gain controller, and a second lens configured to focus the parallel light passed through the first lens on a certain area by shifting a path of the parallel light; a polarization controller formed of a QWP disposed between the first lens and the second lens, and configured to control polarization of the laser light by adjusting an angle thereof with respect to a high-speed axis or low-speed axis of the optical fiber constituting the gain controller; a saturable absorber configured to saturably absorb and reflect the laser light passed through the second lens; a resonance controller formed of a large mode area (LMA) fiber, and configured to adjust a resonance length; an OC in which a Bragg grating is formed from one end toward the other end in an LMA fiber, and configured to output mode-locked laser light; and a pump light coupler disposed between the first lens and the QWP, and configured to provide the pump laser input from the pump laser generator to the gain controller and pass laser light directed from the saturable absorber toward the gain controller or from the gain controller toward the saturable absorber. Here, at least one of a focal length of the second lens, power of the pump laser output from the pump laser generator, and reflectivity of the OC is adjusted to set fluence, which is defined as energy density per unit area of the laser light incident on the saturable absorber, to be greater than reference fluence, which is energy density per unit area of the laser light incident on the saturable absorber when reflectivity of the saturable absorber is a maximum.

Advantageous Effects

An apparatus for generating a single-polarization mode-locked laser capable of energy control according to the present invention can solve the problem of multiple pulses generated from a high-energy mode locked laser, and generate a single-polarization mode-locked fiber laser of which energy can be controlled without generating multiple pulses. Also, by operating a semiconductor saturable absorber mirror (SESAM) in a region in which a function of reflectivity with respect to fluence has a negative slope due to superiority in two-photon absorption (TPA), the apparatus can be self stabilized and generate a mode-locked pulse of which energy can be controlled without using discrete spectral filters.

MODE FOR INVENTION

Hereinafter, an apparatus for generating a single-polarization mode-locked laser capable of energy control according to the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

An apparatus for generating a laser according to the present invention emits a series of linearly chirped pulses having a pump-to-output-power conversion (POCE) of 63% with the minimum number of resonant devices in a standing wave configuration. In an apparatus for generating a laser according to an exemplary embodiment of the present invention, a resonator includes a general polarization maintaining (PM) single-mode gain device, a passive optical fiber, and a semiconductor saturable absorber mirror (SESAM) used for pulse energy control and passive mode locking. Based on this constitution, the apparatus can operate the SESAM in a region in which reflectivity has a negative slope due to superiority in two-photon absorption (TPA), and can generate a pulse of which energy can be controlled without using discrete spectral filters. Also, by maintaining a single-pulse state within an intensity range of all pump light, the apparatus for generating a laser according to the present invention generates a series of pulses having a pulse energy of 48 nJ and a pulse width of 58 ps at a pump power of 585 mW and a repetition rate of 7.72 MHz, and gives a time bandwidth product (TBP) of 84.

Figure 1:
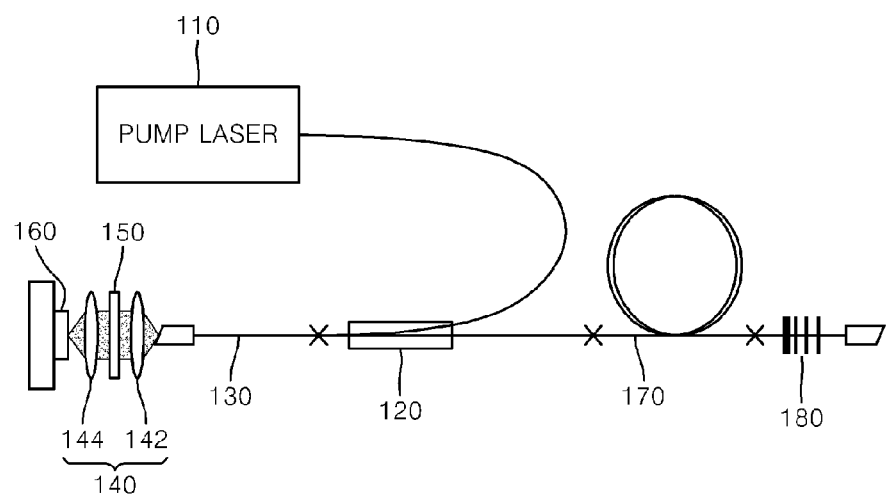
FIG. 1 illustrates an apparatus for generating a single-polarization mode-locked laser according to an exemplary embodiment of the present invention capable of energy control and employing a single-mode fiber.

FIG. 1 illustrates an apparatus for generating a single-polarization mode-locked laser according to an exemplary embodiment of the present invention capable of energy control and employing a single-mode fiber.

Referring to FIG. 1, an apparatus 100 for generating a fiber laser according to the present invention includes a pump laser generator 110, a pump light coupler 120, a gain controller 130, a lens unit 140, a polarization controller 150, a saturable absorber 160, a resonance controller 170, and an output coupler (OC) 180.

The pump laser generator 110 utilizes a pump laser having a specific wavelength. For example, the pump laser generator 110 may be formed of a distributed feedback single-polarization diode laser generator that provides the maximum output power of 585 mW at a wavelength of 976 nm. The pump laser output from the pump laser generator 110 is input to the pump light coupler 120 through an optical transfer medium such as an optical fiber.

The pump light coupler 120 inputs the pump laser input from the pump laser generator 110 to an ytterbium (Yb)-doped fiber (YDF) operating as an active gain material. Also, the pump light coupler 120 outputs a laser input from the gain controller 130 toward the OC 180. The pump light coupler 120 may be formed of a thin-film PM wavelength division multiplexing (WDM) coupler. Meanwhile, the pump light coupler 120 may be disposed between the resonance controller 170 and the OC 180 or outside the OC 180 (i.e., the opposite side to the resonance controller 170).

The gain controller 130 is formed of a YDF having a length of 60 cm and an absorption coefficient of up to 250 dB/m as a gain material. One end of the YDF functioning as the gain controller 130 is connected with the pump light coupler 120, and the other end is exposed to air and outputs a laser to one lens 142 among two lenses constituting the lens unit 140, or outputs a laser incident from the lens 142 to the pump light coupler 120.

The lens unit 140 includes the first lens 142 that generates parallel light by shifting a path of the laser light output from the other end of the gain controller 130, and a second lens 144 that focuses the parallel light passed through the first lens 142 on a certain area by shifting a path of the parallel light.

The polarization controller 150 is disposed between the first lens 142 and the second lens 144 of the lens unit 140, and is formed of a quarter-wave plate (QWP). An angle of the QWP constituting the polarization controller 150 is adjusted with respect to a high-speed axis or low-speed axis of the gain controller 130, thereby controlling a polarization state of an internal resonant electric field.

The saturable absorber 160 saturably absorbs and reflects laser light passed through the second lens 144 of the lens unit 140. The saturable absorber 160 is an important device in the apparatus for generating a single-polarization mode-locked laser according to the present invention. As the saturable absorber 160, a SESAM is used to control pulse energy while maintaining pulse dynamics at a multipulse threshold value or less, that is, in the single-pulse state. The SESAM also helps to start passive mode locking.

The resonance controller 170 is a component for forming an extended linear resonator, and a single-mode fiber (SMF) connected with the pump light coupler 120 is used. A length of the SMF is 12.4 m, but can be changed to control a resonant state.

The OC 180 is connected with the resonance controller 170 through one end, and outputs laser light toward the other end. Here, an optical amplifier for amplifying the output laser light may be coupled to the OC 180. As the OC 180, a negatively chirped fiber Bragg grating (FBG) may be used. The OC 180 is a PM FBG whose peak reflectivity is 10% with a group velocity dispersion (GVD) of −0.11 ps$^2$/mm at 1030 nm, and whose Gaussian bandwidth is 55 nm with a center at 1035 nm.

Total dispersion of the resonator formed of these components is +0.25 ps$^2$, so that the laser operates in a normal dispersion region. To boost the pulse energy to 48 nJ or more, a repetition rate is initially reduced to 7.72 MHz by increasing the length of the passive optical fiber. All parts of the apparatus for generating a fiber laser according to the present invention maintain polarization, and the YDF operating as an active gain material and the SMF support only a fundamental mode at 1030 nm. These have a core diameter of 6 μm, and are coupled with a polarization extinction ratio of 35 dB or more and an intra-cavity loss of 0.5 dB or less.

Figure 2:
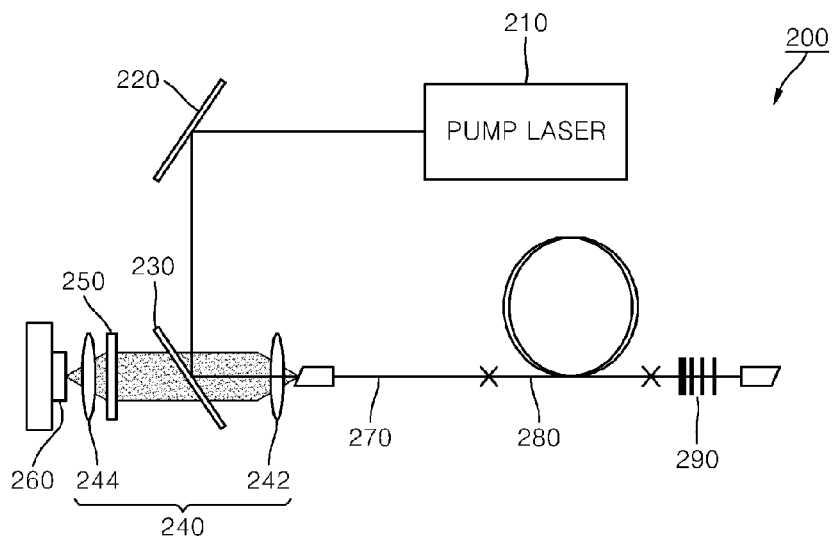
FIG. 2 illustrates an apparatus for generating a single-polarization mode-locked laser according to an exemplary embodiment of the present invention capable of energy control and employing a large mode area (LMA) or double-cladding fiber.

FIG. 2 illustrates an apparatus for generating a single-polarization mode-locked laser according to an exemplary embodiment of the present invention capable of energy control and employing a large mode area (LMA) fiber.

Referring to FIG. 2, an apparatus 200 for generating a fiber laser according to the present invention includes a pump laser generator 210, an optical path shifter 220, a pump light coupler 230, a lens unit 240, a polarization controller 250, a saturable absorber 260, a gain controller 270, a resonance controller 280, and an OC 290.

The pump laser generator 210 utilizes a pump laser having a specific wavelength. For example, the pump laser generator 210 may be formed of a wavelength-stabilized single-polarization diode laser generator that provides the maximum output power of 20 W through an LMA fiber at a wavelength of 976 nm. The pump laser output from the pump laser generator 210 is input to the gain controller 270 formed of an LMA fiber through the optical path shifter 220 and the pump light coupler 230. Here, the optical path shifter 220 and the pump light coupler 230 are disposed on an optical path formed of an optical transfer medium, such as an optical fiber, or free space from the pump laser generator 210 to the gain controller 270. Meanwhile, when the pump laser generator 210 and the pump light coupler 230 are disposed so that the pump laser output from the pump laser generator 210 is directly incident on the pump light coupler 230, the optical path shifter 220 may be removed as an unnecessary component. The optical path shifter 220 may be formed of a reflection mirror that totally reflects the pump laser incident from the pump laser generator 210 to the pump light coupler 230.

The pump light coupler 230 is disposed between two lenses 242 and 244 constituting the lens unit 240, and totally reflects the pump laser, which is reflected by the optical path shifter 220 to be incident, to the gain controller 270. Also, laser light directed from the gain controller 270 toward the saturable absorber 260 or from the saturable absorber 260 toward the gain controller 270 passes through the pump light coupler 230. The pump light coupler 230 may be a dichroic mirror.

The lens unit 240 is formed of the first lens 242 disposed on an optical path between the pump light coupler 230 and the gain controller 270, and the second lens 244 disposed on an optical path between the polarization controller 250 and the saturable absorber 260. The first lens 242 serves to collimate and focus the pump laser input through the pump light coupler 230, and generates parallel light by shifting a path of the laser light input from the gain controller 270. The first lens 242 functions as a dichroic collimating lens, and an achromatic lens may be used. The second lens 244 focuses the parallel light passed through the first lens 220 on a certain area by shifting a path of the parallel light.

The polarization controller 250 is disposed between the first lens 242 and the second lens 244 of the lens unit 240, and formed of a QWP. An angle of the QWP constituting the polarization controller 250 is adjusted with respect to a high-speed axis or low-speed axis of the gain controller 270, thereby controlling a polarization state of an internal resonant electric field.

The saturable absorber 260 saturably absorbs and reflects laser light passed through the second lens 244 of the lens unit 240. The saturable absorber 260 is an important device in the apparatus for generating a single-polarization mode-locked laser according to the present invention. As the saturable absorber 260, a SESAM is used to control pulse energy while maintaining pulse dynamics at a multipulse threshold value or less, that is, in the single-pulse state.

The gain controller 270 is formed of an LMA YDF having a length of 30 cm and an absorption coefficient of up to 1000 dB/m as a gain material. One end of the gain controller 270 formed of the LMA YDF is connected with the resonance controller 280, and the other end is exposed to air, so that laser light is output to the first lens 242 of the lens unit 240, or the laser light passed through the first lens 242 is input to the other end.

The resonance controller 280 is a component for forming an extended linear resonator, and an LMA fiber connected with the gain controller 270 is used. A length of the LMA fiber is 12.4 m, but can be changed to control a resonant state.

The OC 290 is connected with the resonance controller 280 through one end, and outputs laser light toward the other end. Here, an optical amplifier for amplifying the output laser light may be coupled to the OC 290. As the OC 290, a negatively chirped FBG may be used. The OC 290 is a PM FBG whose peak reflectivity is 10% with a GVD of −0.11 ps$^2$/mm at 1030 nm, and whose Gaussian bandwidth is 55 nm with a center at 1035 nm.

An experiment performed using the apparatus for generating a laser shown in FIG. 1 will be described below. Although the experiment was performed for the exemplary embodiment shown in FIG. 1, a laser generation principle and experimental results obtained from the experiment can also be applied to the exemplary embodiment shown in FIG. 2. In the experiment, a SESAM of Batop Gmbh having a large modulation depth of 18.5% and a strong TPA effect was used to control pulse energy. A reflectivity R of the SESAM is a function of fluence F defined as an energy density per unit area, and is defined as the following equation.

$$R = 1 - \left( \frac{\mu}{1 + F/F_s} + \frac{F}{F_{tp}} + l_{ns} \right) \quad \text{[Equation 1]}$$

Here, μ denotes a modulation depth, $F_s$ denotes a single photon saturation fluence, $F_{tp}$ denotes an inverse fluence slope of the induced TPA effect, and $l_{ns}$ denotes a non-saturable loss.

Figure 3:
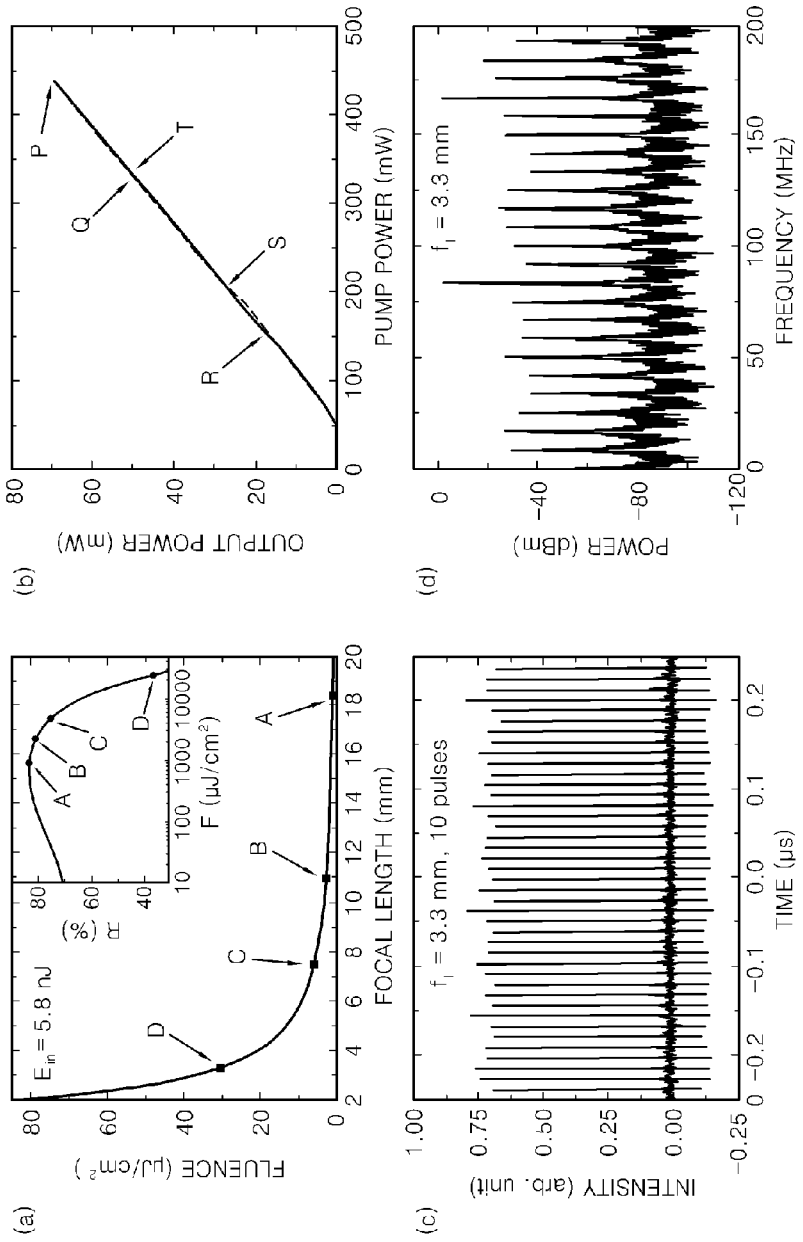
FIG. 3 shows results of an experiment performed by setting a reflectivity ρ of a partially reflective output coupler (OC) replacing a fiber Bragg grating (FBG) of the exemplary embodiment shown in FIG. 1 to 0.45.

In Equation 1, the control variables may be set as $\mu=0/185$, $F_s=73.0$ μJ/cm$^2$, $F_{tp}=42.7$ mJ/cm$^2$, and $l_{ns}=0.129$ based on experimental data. Solid lines in an inset of FIG. 3(a) and FIG. 4(b) denote a controlled reflectivity R. It can be seen from Equation 1 that a maximum $R_{max}(=1-l_{ns}+\sqrt{F_s/F_{tp}}(\sqrt{F_s/F_{tp}}-2\sqrt{\mu})$ of the reflectivity R is 0.837 due to the TPA effect at $F_m=\sqrt{F_s}(\sqrt{\mu F_{tp}}-\sqrt{F_s})=68.6$ μJ/cm$^2$. At this time, R has a negative slope for $F>F_m$.

The fluence F on the SESAM is a central control factor for generating a high energy pulse in the present invention. From the analysis of Gaussian beam propagation, the fluence F can be expressed using YMFO variable factors as in the following equation.

$$F = \frac{E_{in}}{\pi\omega_0^2} \% \frac{\pi E_{in}\omega_1^2}{4\lambda_c^2 f_1^2} \quad \text{[Equation 2]}$$

Here, $E_{in}$ denotes an intra-cavity pulse energy, $\omega_0$ denotes a spot size on the SESAM, $\omega_1$ denotes a cavity beam spot size at the second lens 144 that is a focal lens (FL) shown in FIG. 1, $f_l$ denotes a focal length of the second lens 144, and $\lambda_c$ denotes a center wavelength. Variables used in the experiment were $\omega_1=0.43$ mm and $\lambda_c=1030$ nm.

It can be seen from Equation 1 and Equation 2 that the reflectivity R of the SESAM can be adjusted by setting the fluence F on the SESAM using the experimentally usable variables. For example, according to Equation 2, the intra-cavity pulse energy $E_{in}$ can be increased to a value by increasing the focal length $f_l$ of the second lens 144 while keeping the fluence F on the SESAM constant. Since the fluence F is maintained as a constant, the SESAM has the same reflectivity, and pulse dynamics do not vary.

Self-initiating passive mode-locking is obtained by coupling the SESAM employed as the saturable absorber 160 and the QWP employed as the polarization controller 150. Meanwhile, the saturable absorber 160 may be formed of a total reflection mirror coated with single-wall carbon nanotubes or diamond powder. The saturable absorber 160 has a characteristic that light reflectivity increases in proportion to the intensity of incident light, and preferably has a minimum reflectivity of 70% and a maximum reflectivity of 95% according to the intensity of light. When the minimum reflectivity of a device constituting the saturable absorber 160 is low, laser light can be generated by increasing the power of a pump laser.

The apparatus for generating a laser shown in FIG. 1 operates in a normal dispersion region with a total cavity dispersion of +0.25 ps$^2$, but there is no discrete spectral filter. The intra-cavity pulse energy $E_{in}$ of the apparatus is self stabilized for the given F due to the negative slope of the reflectivity R for $F>>F_m$, and as a result, has a constant value. In other words, the higher the pulse fluence, the higher loss the TPS effect causes, thus effectively canceling saturation of the SESAM. This is similar to a negative feedback effect in a conventional servo controller. In the experiment, the apparatus for generating a laser according to the present invention always operates in a fluence region in which $F>>F_m$. In this region, the TPA effect is superior, and thus the reflectivity R has a relationship of $\Delta R\%~\Delta F/F_{tp}$ and a negative slope.

Figure 4:
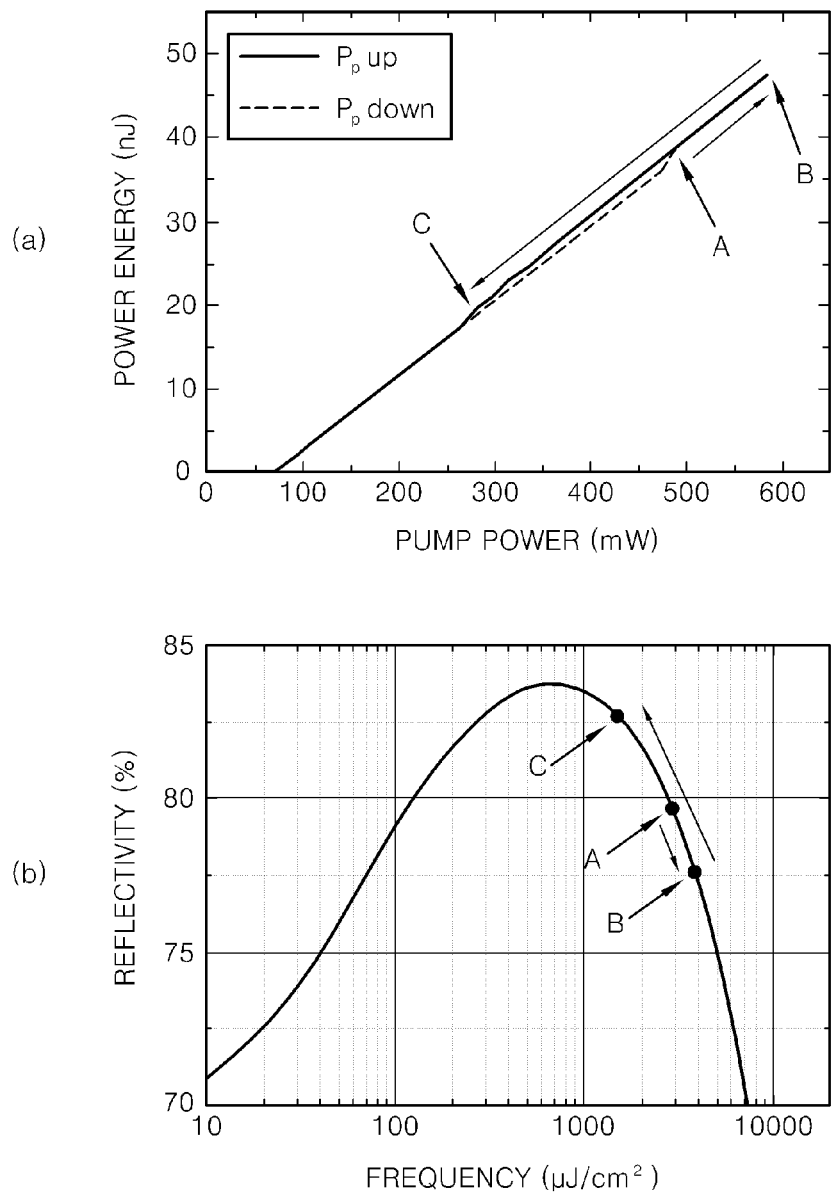
FIG. 4 shows results of an experiment performed by setting a reflectivity ρ of the partially reflective OC replacing the FBG of the exemplary embodiment shown in FIG. 1 to 0.1.
Figure 5:
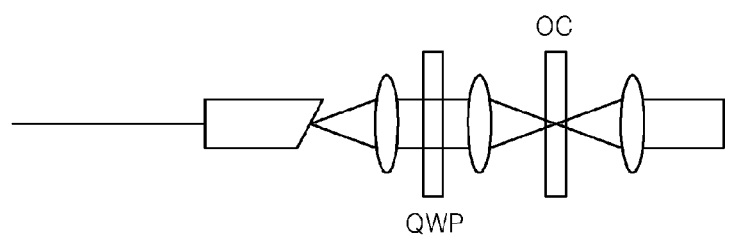
FIG. 5 shows a constitution of the partially reflective OC replacing the FBG of the exemplary embodiment shown in FIG. 1.

To experimentally examine pulse dynamics of the apparatus for generating a laser according to the present invention in relation to the fluence region in which $F>>F_m$, an OC formed of devices shown in FIG. 4 was installed instead of the FBG operating as the OC 180 in the apparatus 100 for generating a laser shown in FIG. 1. By increasing a reflectivity ρ of the substituted partially reflective OC to 0.45, a threshold intra-cavity pulse energy $E_{th}$ of the apparatus 100 for generating a laser according to the present invention was reduced, and the focal length $F_l$ of the second lens 144 was changed. In the experiment, a maximum pump power $P_{max}$ of the apparatus 100 for generating a laser according to the present invention was fixed. In FIG. 3(a), the fluence F calculated according to Equation 2 is represented by a solid line as a function of the focal length $f_l$ of the second lens 144 when $E_{th}=5.8$ nJ, and four pieces of experimental data A, B, C and D are represented by filled squares. The reflectivity R of the SESAM at these points is shown in the inset of FIG. 3(a).

According to Equation 2, the fluence F on the SESAM with respect to a fixed $E_{in}$ is reduced to a second-order equation as the focal length $f_l$ of the second lens 144 increases. At the point A at which the focal length $f_l$ of the second lens 144 is 18.4, the fluence F is 0.98 mJ/cm$^2 \approx 13.7$ $F_m$. This fluence is too low to start self initiating mode-locking with $E_{th}=5.8$ nJ. At the points B, C and D, the apparatus 100 for generating a fiber laser according to the present invention has the same $E_{th}$ of 5.8 nJ in the single-pulse state.

Along with an increase in a pump power $P_p$ with respect to the focal length $f_l$ of the second lens 144 that is less than 18.4 mm, the apparatus 100 for generating a laser according to the present invention switches from the single-pulse state to a multipulse state. However, when the pump power $P_p$ is reduced to the original, the apparatus 100 for generating a laser according to the present invention shows the hysteresis characteristic. Similarly, as the focal length $f_l$ of the second lens 144 is reduced to 11.0 mm, 7.5 mm and 3.3 mm with respect to a fixed pump power (e.g., $P_p=437$ mW), a single pulse (FIG. 3(b)), two pulses (FIG. 3(c)) and ten pulses (FIG. 3(d)) corresponding to the focal length $f_l$ are observed within a cavity round trip time period of 119 ns. Referring to FIG. 3(b), dependency of an average output power $P_a$ on the pump power $P_p$ is shown with respect to, for example, the focal length $f_l$ of 7.5 mm.

Meanwhile, passive mode-locking occurs at a point S at which the pump power $P_p$ is 203 mW. At this time, the average output power $P_a$ is 27 mW, and an output pulse energy $E_{out}$ is 3.2 nJ per pulse. The single-pulse state is maintained up to a point T at which the pump power $P_p$ is 333 mW. At this time, the apparatus 100 for generating a laser according to the present invention starts oscillating in a two-pulse state in which the average output power $P_a$ is 50 mW, and the output pulse energy $E_{out}$ is 3.0 nJ per pulse. The two-pulse state is maintained up to a point P at which the pump power $P_p$ is the maximum available pump power $P_{max}$, where the output pulse energy $E_{out}$ is 4.1 nJ per pulse and the POCE is 15%. When the pump power $P_p$ is reduced from the point P, the apparatus 100 for generating a laser according to the present invention returns from the two-pulse state to the single-pulse state at the pump power $P_p$ of 333 mW, and maintains the single-pulse state to show the hysteresis characteristic until the pump power $P_p$ becomes 150 mW.

When the apparatus 100 for generating a laser according to the present invention is in the multipulse state, a series of pulses shows a harmonic mode locking characteristic. A repetition rate $f_r$ increases as a multiple of a fundamental repetition rate $f_{rep}$ (i.e., $f_r=nf_{rep}$, n=2, 3, 4, ...). Referring to FIG. 3(c), when the focal length $f_l$ is 3.3 mm and the pump power $P_p$ is 437 mW, a pulse series of the apparatus for generating a laser according to the present invention that is operating in a ten-pulse state are shown in the time domain, and the resultant pulse energy $E_{out}$ is 0.86 nJ per pulse. Also, it can be seen that a pulse interval is reduced to T/10=11.9 ns. In the corresponding RF spectrum shown in FIG. 3(d), a repetition rate $f_r$ is $10f_{rep}$=84 MHz. At $nf_r$ (n=1, 2, . . . ), a beat note size is about 20 dB, which is greater than a beat note size of the fundamental repetition rate $f_{rep}$ and the harmonic frequency. The harmonic suppression ratio of 20 dB clearly shows that a harmonic mode-locking state has been stabilized. Thus, during a pulse round trip time of T=119 ns, there are n equidistant pulses in the resonator.

As described above with reference to FIG. 3, pulse energy can be controlled using a function of the fluence F on the SESAM, and the fluence F can be independently adjusted by the pump power $P_p$, the cavity beam spot size $\omega_1$, the focal length $f_l$ and the reflectivity $\rho$ of the OC. The apparatus 100 for generating a laser according to the present invention emits the highest pulse energy required by most applications in the single-pulse state, which can be readily implemented in the apparatus 100 for generating a laser according to the present invention by reducing the reflectivity $\rho$ of the OC and increasing the focal length $f_l$ and the pump power $P_p$ without switching to the multipulse state when $P_p \leq P_{max}$.

In a theorem-proving experiment showing an apparatus for generating a fiber laser that did not show multipulse dynamics when $P_p \leq P_{max}$, the reflectivity $\rho$ of the OC was reduced by 0.1 using the FBG OC 180 directly coupled to the SMF 170 having low coupling loss. Also, the focal length was set to 15.3 mm so that the apparatus for generating a laser could operate in the single pulse state even at the maximum pump power $P_p = P_{max}$=585 mW. In the final resonator structure, the fundamental repetition rate $f_{rep}$ was slightly adjusted to 7.72 MHz due to a change in resonance length. Referring to FIG. 4(a), dependency of the average output power $P_a$ on the pump power $P_p$ is shown, and it is the single-pulse state at the maximum pump power (i.e., $P_p = P_{max}$). Passive mode-locking occurs at a point B having the pump power $P_p$ of 489 mW increased due to an increased output coupling ratio of 0.9 (=1−ρ). At the point B, the apparatus 100 for generating a laser according to the present invention emits the highest pulse energy. At this time, the apparatus 100 for generating a laser according to the present invention has an average output energy of 48 nJ at the pump power of 585 mW, and shows the highest POCE of 63.3% among hitherto reported POCEs of apparatuses for generating a mode-locked fiber laser. When the pump power $P_p$ is reduced from the point B, the apparatus for generating a laser shows the hysteresis characteristic again. The apparatus for generating a laser still operates in the single-pulse state until the power energy reaches a point C having a much lower pump power of 280 mW (this is much lower than the pump power's upper threshold value of 489 mW) at which the average output pulse energy is 19 nJ Important points A, B and C shown in FIG. 4(a) are on a reflectivity curve of the SESAM as a function of the fluence F shown in FIG. 4(b). At the point A, passive mode-locking is started, and the reflectivity R with respect to the fluence F of 10.1 mJ/cm² ($\gg F_m$) is 0.63. At the point B, the reflectivity R is reduced to 0.58 due to the TPA effect in the SESAM having the increased fluence F of 12.5 mJ/cm². The apparatus for generating a laser according to the present invention has a much larger single-pulse region when the power energy returns to the point C showing the hysteresis characteristic. At this time, the reflectivity R is 0.75, and the fluence F is 4.9 mJ/cm². Thus, by fixing the reflectivity $\rho$ of the OC and the focal length $f_l$ and simply changing the pump power $P_p$, it is possible to obtain single-pulse energy continuous from 19 nJ to 48 nJ. In terms of $F_{tp}$, the apparatus for generating a laser according to the present invention operates in the single-pulse state within a fluence range of $0.11 F_{tp} \leq F \leq 0.29 F_{tp}$ (here, $\Delta R\% \sim \Delta F/F_{tp}$).

Figure 6:
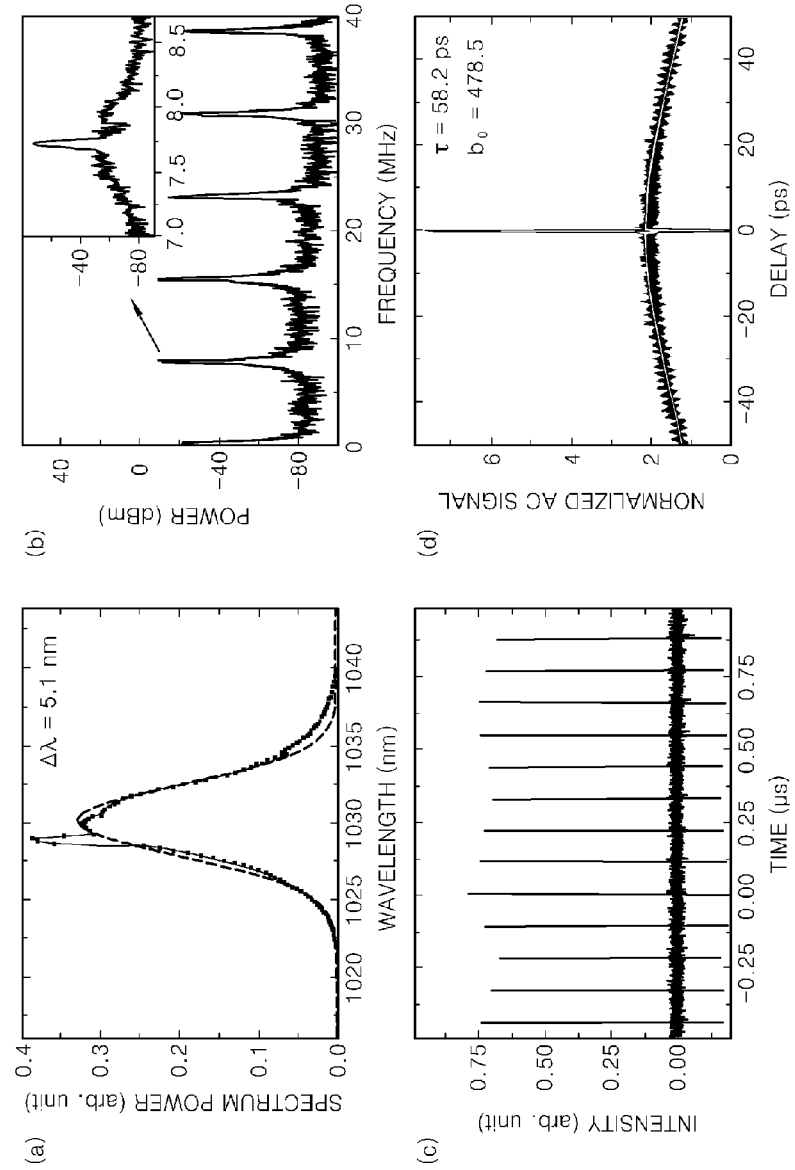
FIG. 6 shows operational characteristics of the exemplary embodiment shown in FIG. 1 at the maximum pulse energy.

FIG. 6 shows operational characteristics of an apparatus for generating a laser according to the present invention at the maximum pulse energy. The optical spectrum shown as filled squares in FIG. 6(a) has a full-width at half-maximum (FWHM) of $\Delta\lambda$=5.1 mm. In FIG. 6(a), a measured power spectral density appropriately coincides with a Gaussian intensity envelope function (solid line) with respect to a Gaussian pulse E(t), which is expressed as the following equation and chirped in the optical frequency domain, except for a Raman peak on the left portion.

$$E(t) = \sqrt{P(t)} \exp\left[-2\ln(2)(1 + ib_0(t))\frac{t^2}{\tau^2}\right] \qquad \text{[Equation 3]}$$

Here, P(t) denotes a peak power, $b_0(t)$ denotes a unitless chirp variable, and τ denotes an FWHM of a pulse.

FIG. 6(b) shows an RF spectrum of a pulse series in the frequency domain, and FIG. 6(c) shows traces of the pulse series in the time domain. At 7.72 MHz, a fundamental RF beat note has a signal-to-noise ratio (SNR) of 70 dB or more. Referring to an inset of FIG. 6(b), the fundamental RF beat note has a white phase noise spectrum with a bandwidth of 200 kHz. Compared to a phase noise spectrum with a high repetition rate structure, a relatively wide phase noise spectrum may cause various non-linear effects obtained by a laser pulse having a peak power of 0.83 kW inside the relatively long fiber resonator. Finally, FIG. 6(d) shows an autocorrelation signal of typical interference measurement and an overlapping chirped Gaussian adaptive signal based on Equation 3. These show an FWHM of 58.2 ps and a linear positive chirp variable of 478.5 corresponding to a positive frequency chirp of 0.031 THz/ps. A TBP of a pulse series is as large as 84, and can be externally dechirped using a transmission grating pair.

As described above, the intra-cavity pulse energy of the apparatus for generating a single-polarization mode-locked laser according to the present invention capable of energy control can be self stabilized by a negative feedback structure obtained from fluence dependent on reflectivity of a SESAM having a negative slope due to a TPA effect. Also, the single-pulse state is maintained within the entire range of pulse power in which pulse dynamics can be used, so that a POCE can be increased to 63%. Further, when greater pump power is applied to the apparatus for generating a laser according to the present invention, an optical frequency comb (OFC) having a repetition rate of up to 500 MHz or a small apparatus for generating a femtosecond fiber laser having a pulse energy of 0.1 mJ at a repetition rate of several MHz is expected to be able to be manufactured.

In the above-described apparatus for generating a laser in which an optical fiber doped with Yb is used as a gain material, the gain material doped on the optical fiber may be any one of Yb, Er, thorium (Th), holmium (Ho), and a mixture of these. Also, the new resonant structure applied to the apparatus for generating a laser according to the present invention can be applied not only to an Yb-doped fiber laser generation apparatus but also to other high-energy mode-locked laser generation apparatuses such as an Yb-doped thin film disk laser.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for generating a single-polarization mode-locked laser, comprising:
   a pump laser generator configured to generate a pump laser having a predetermined wavelength;
   a gain controller formed of an optical fiber whose core is doped with a gain material;
   a lens unit including a first lens configured to generate parallel light by shifting a path of laser light output from one end of the optical fiber constituting the gain controller, and a second lens configured to focus the parallel light passed through the first lens on a certain area by shifting a path of the parallel light;
   a polarization controller formed of a quarter-wave plate (QWP) disposed between the first lens and the second lens, and configured to control polarization of the laser light by adjusting an angle thereof with respect to a high-speed axis or low-speed axis of the optical fiber constituting the gain controller;
   a saturable absorber configured to saturably absorb and reflect the laser light passed through the second lens;
   a resonance controller formed of a single-mode fiber (SMF), and configured to adjust a resonance length;
   an output coupler (OC) in which a Bragg grating is formed from one end toward the other end, and configured to output mode-locked laser light; and
   a pump light coupler connected between the gain controller and the resonance controller or between the resonance controller and the OC, and configured to receive and provide the pump laser output from the pump laser generator toward the saturable absorber, or provide the mode-locked laser light to the OC,
   wherein at least one of a focal length of the second lens, power of the pump laser output from the pump laser generator, and reflectivity of the OC is adjusted to set fluence, which is defined as energy density per unit area of the laser light incident on the saturable absorber, to be greater than reference fluence, which is energy density per unit area of the laser light incident on the saturable absorber when reflectivity of the saturable absorber is a maximum.

2. The apparatus of claim 1, wherein, when the focal length of the second lens and the reflectivity of the OC are fixed, the reflectivity of the saturable absorber is set to have a negative slope by adjusting the power of the laser light output from the pump laser generator within a predetermined range.

3. The apparatus of claim 1, wherein, when the focal length of the second lens and the reflectivity of the OC are fixed, the fluence of the saturable absorber is set to have a value between a first real-number multiple and a second real-number multiple of an inverse fluence slope of a two-photon absorption (TPA) effect induced in the saturable absorber by adjusting the power of the laser light output from the pump laser generator within a predetermined range.

4. The apparatus of claim 1, wherein the optical fiber constituting the gain controller is a single-mode polarization-maintaining fiber.

5. The apparatus of claim 4, wherein the gain material is selected from among ytterbium (Yb), erbium (Er), thorium (Th), holmium (Ho), and a mixture of Yb and Er.

6. The apparatus of claim 1, wherein the polarization controller is rotated about an optical path from the first lens to the second lens to control polarization of light incident from the first lens or the second lens.

7. The apparatus of claim 1, wherein the Bragg grating formed in the optical fiber constituting the OC is frequency chirped.

8. The apparatus of claim 1, wherein the saturable absorber is a semiconductor saturable absorber mirror (SESAM) having a non-resonant multiple quantum well (MQW) structure.

9. The apparatus of claim 1, wherein the saturable absorber is a saturable absorber reflection mirror coated with single-wall carbon nanotubes or nanodiamond powder.

10. An apparatus for generating a single-polarization mode-locked laser, comprising:
    a pump laser generator configured to generate a pump laser having a predetermined wavelength;
    a gain controller formed of an optical fiber whose core is doped with a gain material;
    a lens unit including a first lens configured to generate parallel light by shifting a path of laser light output from one end of the optical fiber constituting the gain controller, and a second lens configured to focus the parallel light passed through the first lens on a certain area by shifting a path of the parallel light;
    a polarization controller formed of a quarter-wave plate (QWP) disposed between the first lens and the second lens, and configured to control polarization of the laser light by adjusting an angle thereof with respect to a high-speed axis or low-speed axis of the optical fiber constituting the gain controller;
    a saturable absorber configured to saturably absorb and reflect the laser light passed through the second lens;
    a resonance controller formed of a large mode area (LMA) fiber, and configured to adjust a resonance length;
    an output coupler (OC) in which a Bragg grating is formed from one end toward the other end in an LMA fiber, and configured to output mode-locked laser light; and
    a pump light coupler disposed between the first lens and the QWP, and configured to provide the pump laser input from the pump laser generator to the gain controller and pass laser light directed from the saturable absorber toward the gain controller or from the gain controller toward the saturable absorber,
    wherein at least one of a focal length of the second lens, power of the pump laser output from the pump laser generator, and reflectivity of the OC is adjusted to set fluence, which is defined as energy density per unit area of the laser light incident on the saturable absorber, to be greater than reference fluence, which is energy density per unit area of the laser light incident on the saturable absorber when reflectivity of the saturable absorber is a maximum.

11. The apparatus of claim 10, wherein, when the focal length of the second lens and the reflectivity of the OC are fixed, the reflectivity of the saturable absorber is set to have a negative slope by adjusting the power of the laser light output from the pump laser generator within a predetermined range.

12. The apparatus of claim 10, wherein, when the focal length of the second lens and the reflectivity of the OC are fixed, the fluence of the saturable absorber is set to have a value between a first real-number multiple and a second real-number multiple of an inverse fluence slope of a two-photon absorption (TPA) effect induced in the saturable absorber by adjusting the power of the laser light output from the pump laser generator within a predetermined range.

13. The apparatus of claim 10, wherein the optical fiber constituting the gain controller is an LMA single-mode polarization-maintaining fiber.

14. The apparatus of claim 13, wherein the gain material is selected from among ytterbium (Yb), erbium (Er), thorium (Th), holmium (Ho), and a mixture of Yb and Er.

15. The apparatus of claim 10, wherein the polarization controller is rotated about an optical path from the first lens to the second lens to control polarization of light incident from the first lens or the second lens.

16. The apparatus of claim 10, wherein the Bragg grating formed in the optical fiber constituting the OC is frequency chirped.

17. The apparatus of claim 10, wherein the saturable absorber is a semiconductor saturable absorber mirror (SESAM) having a non-resonant multiple quantum well (MQW) structure.

18. The apparatus of claim 10, wherein the saturable absorber is a saturable absorber reflection mirror coated with single-wall carbon nanotubes or nanodiamond powder.

19. The apparatus of claim 10, further comprising an optical path shifter configured to totally reflect the pump laser input from the pump laser generator to the pump light coupler.

20. The apparatus of claim 10, wherein the first lens collimates and focuses the pump laser input through the pump light coupler, and generates parallel light by shifting a path of laser light input from the gain controller.

* * * * *